Figure 1:
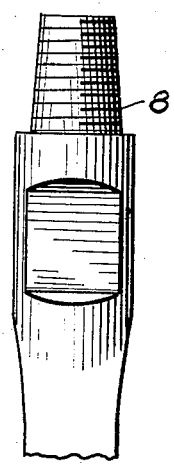

Feb. 17, 1925.

V. MONROE

ROPE KNIFE

Filed Sept. 13, 1922

1,526,557

WITNESSES
J. Herbert Bradley

INVENTOR
Verne Monroe
By Green and McCallister
His Attorneys

Patented Feb. 17, 1925.

1,526,557

UNITED STATES PATENT OFFICE.

VERNE MONROE, OF CAMERON, WEST VIRGINIA, ASSIGNOR TO SPANG AND COMPANY, OF BUTLER, PENNSYLVANIA, A CORPORATION OF PENNSYLVANIA.

ROPE KNIFE.

Application filed September 13, 1922. Serial No. 587,915.

*To all whom it may concern:*

Be it known that I, VERNE MONROE, a citizen of the United States, and a resident of Cameron, in the county of Marshall and the State of West Virginia, have made a new and useful Invention in Rope Knives, of which the following is a specification.

This invention relates to rope or line knives, such as are ordinarily employed as a part of drilling equipment.

An object of the invention is to produce a knife of this type, which may be easily and quickly put in place on the line or cable to be cut and in which means are employed for insuring effective operation of the cutting blade.

A further object is to produce a line knife which is rugged and durable and will not operate until it strikes the top of the rope socket, bailer or pump, or any other implement to which the line to be cut is connected.

These, and other objects which will be made more apparent throughout the further description of the invention, are attained by means of a knife embodying the features herein described and illustrated in the drawings accompanying and forming a part hereof.

Figure 2:
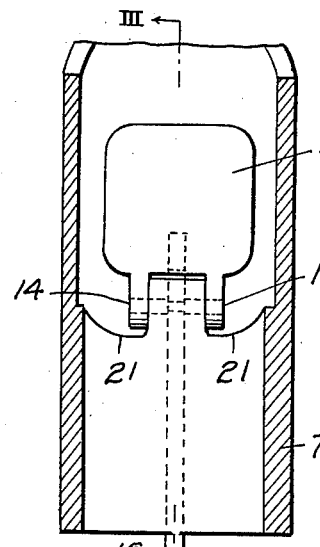
Figure 4:
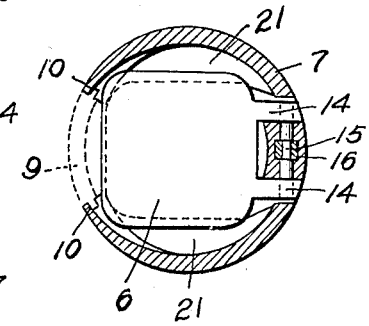
Figure 3:
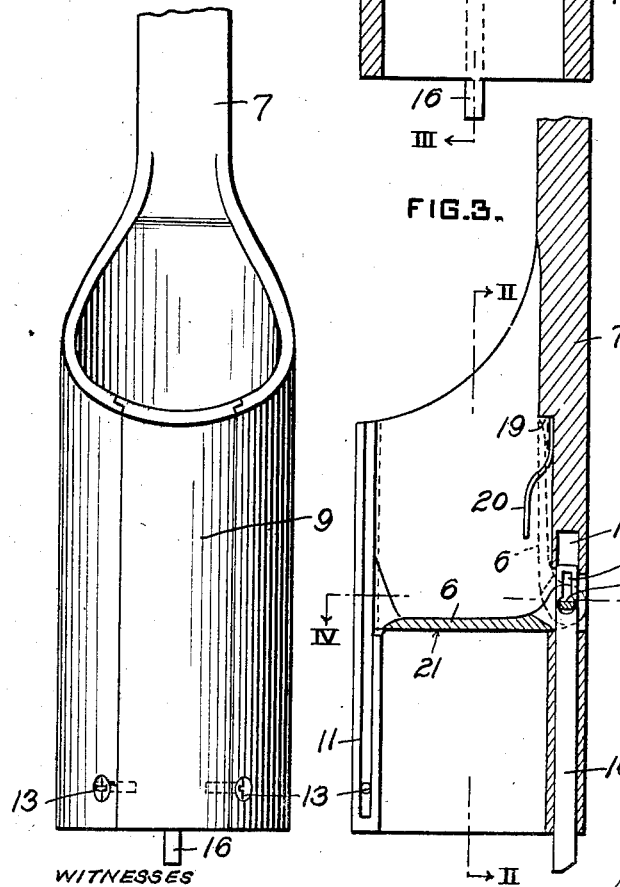
Figure 5:
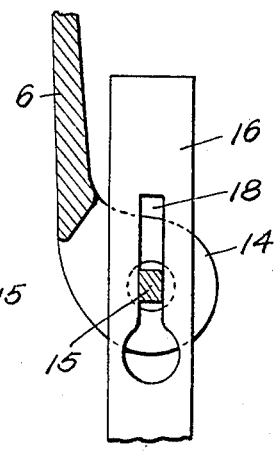

In the drawings, Figure 1 is a side elevation of a rope knife embodying my invention. Fig. 2 is a fragmental sectional view of the apparatus illustrated in Fig. 1, the section being taken along the line II—II of Fig. 3. Fig. 3 is a sectional view along the line III—III of Fig. 2, showing the cutting blade in the final cutting position in full lines and in the inoperative or set position in dotted lines. Fig. 4 is a transverse sectional view along the line IV—IV of Fig. 3, and Fig. 5 is an enlarged detail of an operating key shown in connection with a fragmental sectional view of the cutting blade.

One of the features of the present invention is that the line knife may be placed in position on the line to be cut without disengaging the line from the winding reel or drum. Another feature is that the cutting blade of the knife is retained in an inoperative position until released by contact with a rope socket of a tool lodged in the well, and when so released it is forcibly projected into engagement with the line to be cut in such a way that the line is clamped between the cutting blade and the housing thereof during the cutting operation. Another feature of the invention is that the blade housing is provided with a support or anvil which limits the movement of the cutting blade with relation to the housing and by forming a support for the edges of the blade reinforces it during the final stage of the cutting operation.

As illustrated, the cutting blade 6 is pivotally mounted in a substantially cylindrical housing 7 which is provided with a longitudinally extending way through which the line to be cut may extend. The upper end of the housing is provided with an integrally formed pin 8 such as is employed in connection with a drilling equipment and to which the suspending line is adapted to be coupled. In order to facilitate and simplify the operation of placing the line knife in position on the line to be cut, the housing is formed in two parts or, as shown, is provided with a removable portion or slide 9 which forms a part of the substantially cylindrical portion of the housing and when removed exposes a lateral opening, extending longitudinally of the housing, through which the line to be cut may be moved so that the housing surrounds it. The slide 9 is shown having a tongue 10 along each lateral edge which is adapted to engage a correspondingly formed groove 11 in the adjacent edge of the housing proper. As shown in Fig. 3, the grooves 11 do not extend throughout the entire length of the housing proper but are closed at the lower ends for the purpose of forming a stop for the slide and holding it rigidly in place. The slide is also held in place by means of set screws 13 which extend through apertures formed in the housing and located on opposite sides of the slide.

The blade 6 is provided at its pivoted end with mounting lugs 14. The lugs 14 are preferably spaced as illustrated in Fig. 4 and are keyed or otherwise rigidly mounted on a pivot pin 15. The pin 15 is pivotally mounted in the housing 7 so that the blade may swing from a position substantially parallel with the housing to a position across, that is, into the line way provided in the housing. As clearly shown in Figs. 4 and 5, the intermediate portion of the pin 15 is rectangular in cross-section and is adapted to be engaged by a key 16 for the purpose of holding the blade in the inoperative position shown in dotted lines in Fig. 3. The key illustrated is mounted in a way 17 formed in the housing and so arranged that the lower end projects beyond the lower end of the housing when the key is in place therein and is located in a blade-locking position. The key 16 is disclosed as provided with slot 18 which extends longitudinally thereof and throughout a portion of its length is of such width as to engage the squared or rectangular portion of the pin 15 and prevent the pin from turning. The lower portion of the slot is widened out so that the squared portion of the pin may freely turn therein without engagement with the sides thereof. With this arrangement, the blade 6 may be locked in a position substantially parallel with the housing by moving the key 16 downwardly along its mounted way so that the narrow portion of the slot 18 engages the squared portion of the key, and the lower end of the key projects beyond the housing. The key is also of such length that an upward movement, occasioned by contact with an unassociated element, will release the blade and permit it to move across or into the line way formed in the housing, due to the fact that the narrow portion of the slot 18 moves out of engagement with the pin 15.

As shown in Fig. 3, the interior of the housing 7 is recessed at 19 to receive the blade 6 when it is in the inoperative or set position. A spring 20, secured to the housing 7 within the confines of the recess, is so arranged that it is compressed when the blade is in the position shown in dotted lines in Fig. 3, and operates to forcibly move the blade into the lineway when the blade is released by an upward movement of the key 16. It will be apparent that the pressure of the spring 20 operates through the squared portion of the pin 15 and prevents the key from being accidentally moved from the blade-locking position. The housing 7 is so formed as to provide shoulders 21 so located that they support the edges of the blade 6 when the blade is in the final position across the lineway. This final position is shown in full lines in Fig. 3.

The operation of locating the line knife in place on a line to be cut and of cutting the line is as follows: The knife is secured to a supporting cable which is connected to the pin 8 thereof in the usual manner. The slide 9 is then removed from the housing 7 and the housing is moved to position on the line to be cut so that the line extends through the lineway or is located substantially concentric with the cylindrical portion of the housing. The slide 9 is then slid into place, the set screws 13 screwed up to positively hold it in place, it being understood that the blade 6 is moved to the dotted line position shown in Fig. 3 and is locked in that position by the key 16. The line knife is then lowered into the well by means of a supporting cable along the line to be cut and as soon as the lower end of the key 16 engages the rope socket, pump or bucket to which the line to be cut is connected, the key is forced upwardly along its mounting way, thereby releasing the blade 6 and permitting it to swing downwardly in response to pressure of the spring 20 so that its cutting edge engages the line extending through the lineway. The knife, that is the housing and all associated parts, is then drawn upwardly by means of the supporting cable, thereby forcing the blade 6 into and through the line to be cut, since the upward pull of the housing is resisted by the line to be cut and thereby causing the blade to swing downwardly toward a horizontal position and forcing the cutting edge into and through the line to be cut. It is apparent that during this cutting operation the line to be cut is forced against the housing, or in the knife illustrated, that portion of the housing which constitutes the slide 9. In setting the blade 6 it is forced into the recess 19, thereby compressing the spring 20, and it is held in this position while the key 16 is moved downwardly to bring the narrow portion of the slot 18 into engagement with the squared portion of the pivot pin 15.

While I have described and illustrated but one embodiment of my invention, it will be apparent to those skilled in the art that various changes, modifications, substitutions, additions and omissions may be made in the apparatus illustrated without departing from the spirit and scope of the invention as set forth by the appended claims.

I claim as my invention:

1. A line knife comprising a substantially cylindrical housing through which a line to be cut is adapted to extend, a cutting blade pivotally mounted within the housing, and adapted to swing from a position adjacent the housing to a position across the rope receiving interior thereof, and a key mounted on the housing for locking the blade in the first-mentioned position and movable longitudinally with relation to the housing for releasing the blade.

2. A line knife comprising a substantially cylindrical housing through which a line to be cut is adapted to extend, a cutting blade pivotally mounted within the housing, and adapted to swing from a position adjacent the housing to a position across the rope receiving interior thereof, and means projecting beyond the lower end of the housing movable relatively thereto for locking the blade in the first-mentioned position.

3. A line knife comprising a substantially cylindrical housing through which a line to be cut is adapted to extend, a cutting blade pivotally mounted within the housing, and adapted to swing from a position adjacent the housing to a position across the rope receiving interior thereof, and means projecting beyond the lower end of the housing for locking the blade in the first-mentioned position and movable upon contacting with an unassociated element to release the blade.

4. A line knife comprising a substantially cylindrical housing through which a line to be cut is adapted to extend, a cutting blade pivotally mounted within the housing, and adapted to swing from a position adjacent the housing to a position across the rope receiving interior thereof, and a key mounted in a way extending longitudinally of the housing for locking said blade in the first-mentioned position; said key projecting beyond the housing and adapted to be moved by contact with an external element to release said blade.

5. A line knife comprising a substantially cylindrical housing through which a line to be cut is adapted to extend, a cutting blade pivotally mounted within the housing, and adapted to swing from a position adjacent the housing to a position across the rope receiving interior thereof, and a key mounted in a way extending longitudinally of the housing and projecting beyond the lower end of the housing for locking the blade in the first-mentioned position and movable along the way inwardly with relation to the housing for releasing the blade.

6. A line knife comprising a substantially cylindrical housing through which a line to be cut is adapted to extend, a cutting blade pivotally mounted within the housing, and adapted to swing from a position adjacent the housing to a position across the rope receiving interior thereof, a key mounted in a way extending longitudinally of the housing and having a slot formed therein for operatively engaging said blade and locking it in the first-mentioned position, and a spring between said blade and said housing for forcing the blade to the second mentioned position.

7. The combination in a line knife of a housing through which the line to be cut is adapted to extend, a shaft rotatably journaled in said housing, a cutting blade mounted on said shaft and adapted to swing from a position adjacent a wall of the housing to a position across the interior thereof and means for preventing rotation of said shaft so as to lock said blade in the first mentioned position.

8. The combination in a line knife of a housing through which the line to be cut is adapted to extend, a shaft rotatably journaled in said housing, a cutting blade mounted on said shaft and adapted to swing from a position adjacent the housing to a position across the interior thereof and means for releasably engaging said shaft so as to lock said blade in the first mentioned position.

9. The combination in a line knife of a housing through which the line to be cut is adapted to extend, a shaft rotatably journaled in said housing, a cutting blade mounted on said shaft and adapted to swing from a position adjacent the housing to a position across the interior thereof, an angular surface on said shaft and means for engaging said angular surface so as to lock said blade in said first mentioned position.

10. The combination in a line knife of a housing through which the line to be cut is adapted to extend, a shaft rotatably journaled in said housing and provided with a squared portion, a cutting blade mounted on said shaft and adapted to swing from a position adjacent the housing to a position across the interior thereof and a key provided with a slot adapted to engage the squared portion of said shaft so as to lock said blade in the first mentioned position, said key extending below the housing and adapted to be moved by contact with an external object so as to release said blade.

In testimony whereof, I have hereunto subscribed my name this 15th day of July, 1922.

VERNE MONROE.